March 12, 1935.    R. W. McLAUGHLIN    1,994,320
RELIEF VALVE
Filed May 29, 1933
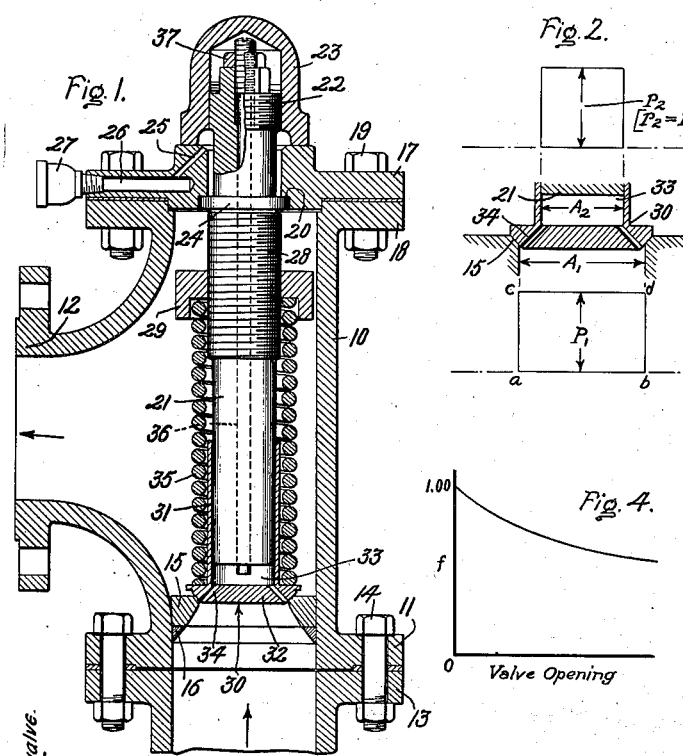
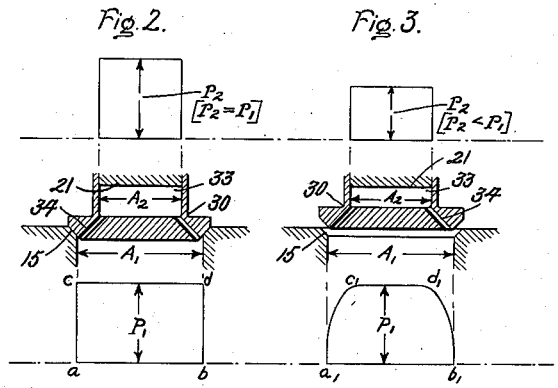
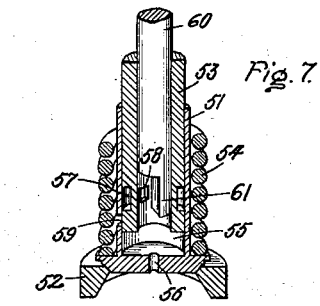
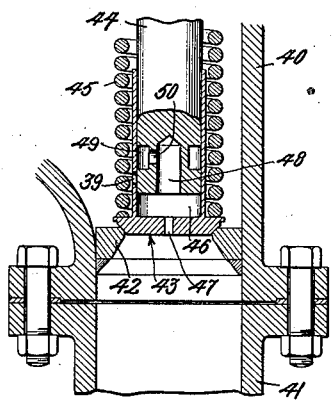
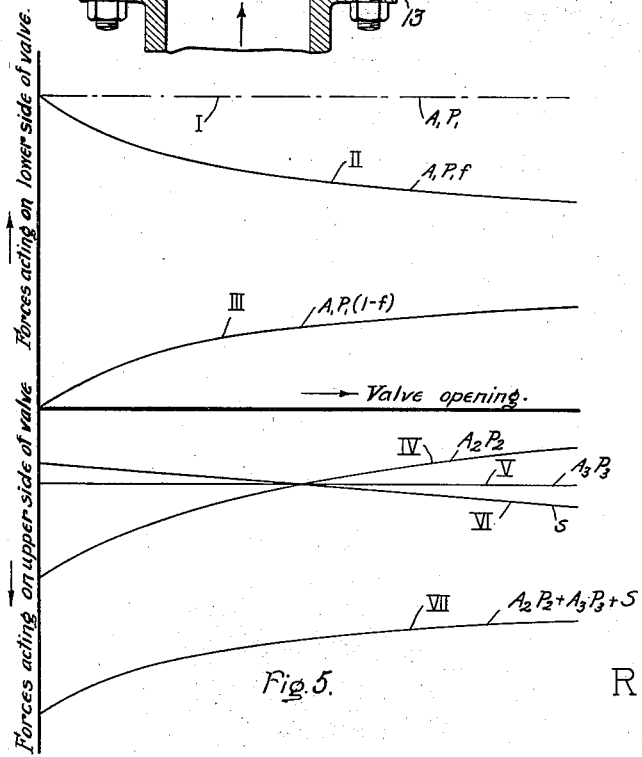
Inventor:
R Wayne McLaughlin,
by Harry E. Dunham
His Attorney.

Patented Mar. 12, 1935

1,994,320

UNITED STATES PATENT OFFICE 1,994,320

RELIEF VALVE

R. Wayne McLaughlin, Scotia, N. Y., assignor to General Electric Company, a corporation of New York Application May 29, 1933, Serial No. 673,448

6 Claims. (Cl. 251—146)

The present invention relates to relief valves for relieving a fluid under fluctuating pressure when the pressure reaches or exceeds a predetermined value.

The ordinary relief valve comprises a movable valve member and a spring for biasing the valve member towards its seat. Such a valve has a positive regulation, that is, a gradual increase in pressure is required to move the valve member away from its seat. Or, from another viewpoint, such a valve does not permit the pressure to be relieved to be maintained constant but effects an increase in pressure in response to the opening travel of the valve. Furthermore, the movable member of such a relief valve has a tendency to vibrate if there is some disturbance in the fluid pressure, particularly when the movable valve member is riding near its seat.

One object of my invention is to provide an improved structure and arrangement of relief valve whereby any desirable regulation of the valve may be obtained, and particularly whereby a constant pressure in a container may be maintained irrespective of the position of the movable member of the relief valve. This is accomplished in accordance with my invention by the provision of means biasing the movable valve member towards its seat with a force decreasing in response to the opening travel of the movable valve member.

For a better understanding of what I believe to be novel and my invention, attention is directed to the following description and the claims appended thereto in connection with the accompanying drawing.

In the drawing, Fig. 1 represents a valve structure embodying my invention; Figs. 2 to 5 are explanatory illustrations; and Figs. 6 and 7 represent modifications of my invention.

The valve structure shown in Fig. 1 comprises a casing 10 having a flanged portion 11 defining an inlet and another flanged portion 12 defining an outlet. The flanged portion 11 is fastened to a flanged conduit portion 13 by means of bolts 14. The flanged portion 13 may form a part of a conduit, a drum or like container for containing fluid under pressure. A ring member 15 defining a valve seat is fastened to the inlet portion by a weld 16, thus forming a part of the valve casing. A cover 17 is fastened to another flanged portion 18 of the casing by means of bolts 19. The cover 17 defines a seat 20 for a stem 21. The latter has an upper threaded portion 22 engaging a threaded portion of a cap 23 which has a face bearing against the cover 17. It will be readily seen that turning of the cap 23 on the stem 21 causes the latter to travel upward so that a collar 24 of the stem is forced towards the seat 20 of the cover 17. The latter is provided with channels 25, 26 closed by a plug 27 for draining fluid leaking past the seat 20 and the collar 24 into the cap 23. An intermediate portion 28 of the stem is screw-threaded for holding an adjustable spring plate 29.

The movable member 30 of the valve in accordance with my invention comprises a cylindrical member 31 slidably arranged on the lower end of the stem, and a bottom plate or disk 32. This movable member 30, as will be readily seen from the drawing, defines with the stem a chamber 33 which communicates with the inlet of the valve through openings 34 in the disk. A spring 35 concentrically arranged with the cylindrical portion of the movable member and the stem is held between the disk of the movable member and the spring plate 29. The spring is under compression which may be adjusted by turning the spring plate on the screw-threaded portion of the stem and the spring biases the movable member towards its seat. A pin 36 projecting through a bore in the stem and screw-threaded to the upper portion of the stem serves for limiting the opening movement of the movable valve member. The pin is secured in its position by a lock nut 37.

Let us assume that $P_1$ is the pressure in container 13 at which the relief valve should open. Referring to Fig. 2, where I have shown the essential parts of the valve as regards the invention, namely, the valve seat 15, the movable member 30 and the lower end of the stem 21, it will be seen that the force acting on the lower side of the valve is determined by the pressure $P_1$ and by the area $A_1$ on which the pressure acts and is equal to the product $A_1 \times P_1$ represented by the area $abcd$.

In Fig. 3 I have shown the movable valve member moved away from its seat so that fluid under pressure may flow through the opening defined between the movable member and the seat. This flow of fluid causes a conversion of the potential energy of the fluid into kinetic or velocity energy, to the effect that the pressure near the edge of the movable member decreases. In this case the force acting on the lower side of the movable member may be expressed as the product of $A_1 \times P_1 \times f$, represented by the area $a_1b_1c_1d_1$, "$f$" representing a factor equal to the ratio $$\frac{a_1b_1c_1d_1}{abcd},$$

in which $a_1b_1c_1d_1$ represents the area shown in Fig. 3 and $abcd$ the area indicated in Fig. 2. The factor "$f$" depends upon the flow and therefore may be termed a flow factor. The force acting on the lower side of the movable member decreases in response to the opening travel. The force is represented by the product $A_1P_1f$, in which $f$ is unity at closed position of the valve and decreases as the valve opens, approaching zero value as the valve is moved away from its seat.

This zero value, however, is not reached in actual relief valve designs. The change of the flow factor in response to the valve opening is shown in Fig. 4.

In order to keep the valve opened in any position at a constant pressure $P_1$ it is necessary to apply a biasing force on the upper side of the valve, which decreases in accordance with the decrease of the magnitude of the flow factor.

The force biasing the movable member towards its seat in the structure according to my invention may be represented as the sum of $A_2P_2 + A_3P_3 + S$, in which $A_2$ represents the area defined by the inner diameter of the cylindrical member 31, $P_2$ the pressure acting within chamber 33, $A_3$ the difference between the areas $A_1$ and $A_2$, $P_3$ the pressure within the outlet, and $S$ the biasing force of the spring. For open position of the valve we have then the following equation:

$$A_1P_1f = A_2P_2 + A_3P_3 + S$$

For our present consideration we may assume the factors $P_1$, $P_3$ to remain constant and $S$ to increase in proportion to the opening travel of the valve. The only variable on the left side of the equation is then $f$ and the only variable on the right side of the equation is $P_2$. This, however, means that we have to change $P_2$ in accordance with the change of the flow factor $f$ to obtain the desired regulation, or, from another viewpoint, we have to decrease the magnitude of $A_2P_2$ in accordance with the decrease of the magnitude of $A_1P_1f$ with the movable member moving away from its seat. This is accomplished with the arrangement shown in Fig. 1 by the chamber 33 which may be termed a pressure chamber defined between the movable member and the stem. The pressure $P_2$ within the chamber is equal to the pressure $P_1 [P_2 = P_1]$ to be relieved as long as the movable member engages its seat (Fig. 2). The pressure $P_2$ is smaller than $P_1 [P_2 < P_1]$ if the movable member is moved away from its seat, as shown in Fig. 3, because the pressure $P_1$ at the entrance to the openings 34 has decreased, the pressure $P_2$ within chamber 33 being substantially equal to the pressure existing at the entrance of the openings 34. The relative decrease of the pressure $P_2$ depends upon the location of the entrances of the openings 34. The closer these entrances are located to the seat of the valve the greater will be the decrease of the pressure $P_2$ for any position of disk 30 and the closer the entrances are located to the center of the valve the less will be the decrease with regard to the arrangement in Fig. 1, and in addition the decrease of $P_2$ depends upon the number and the cross section of the openings.

In Fig. 5 I have plotted against valve opening the various forces acting on the movable member. The dash-dotted line I represents the force $A_1P_1$ acting on the valve during closed position. The curve II represents the force $A_1P_1f$ acting on the lower side of the movable member for different valve opening positions. The essence of the invention as brought out above comprises the provision of means for biasing the movable member toward its seat with a force decreasing in accordance with the decrease of the force $A_1P_1f$. This decrease which is equal $A_1P_1(1-f)$ is represented by curve III. The three forces acting on the upper side of the movable member are represented individually by the curves IV, V and VI, of which the curve IV represents the force $A_2P_2$ exerted by the pressure in chamber 30, $A_3P_3$ represents the force exerted by the pressure $P_3$ in the outlet of the valve, which in the present instance has been assumed to remain constant, and VI represents the force $S$ exerted by the spring which has been assumed to increase in proportion with the opening travel of the valve. The curve VII represents the sum of the three forces which in any position of the movable member is equal to the corresponding product $A_1P_1f$. A valve with this characteristic has zero regulation which means that the pressure $P_1$ is independent of the opening travel of the valve. With the proper proportioning of the pressure chamber 33 and the openings leading thereto I may obtain a relief valve with negative regulation, that is, one in which the pressure $P_1$ to be relieved decreases as the movable member is moved further away from its seat. This is accomplished by an arrangement in which the force $A_2P_2$ represented by curve IV in Fig. 5 decreases faster than shown in Fig. 5.

In Fig. 6, where I have shown a modified arrangement according to my invention, the valve comprises a casing 40 having a flanged portion defining an inlet and being fastened to a container 41 for containing fluid under pressure to be relieved when the pressure reaches and exceeds a predetermined value. An annular member 42 is welded to the inlet of the casing and defines a seat. A movable member 43 is slidably arranged on a fixed stem 44 corresponding to stem 21 in Fig. 1 and biased towards its seat by a spring 45 corresponding to spring 35 in Fig. 1. The movable member and the stem define a chamber 46 which communicates with the inlet of the valve through an opening 47 near the center of the valve disk. The lower end of the stem has a central bore 48 and an outer recess 49 communicating with the bore 48 through an opening 50. The cylindrical member has an opening 39 which in the closed position of the valve is located below the annular recess 49. The pressure within the chamber 46 is equal to the pressure to be relieved as long as the valve is closed. If the valve is opened and moves away from its seat the opening 39 registers gradually with the annular recess 49 and permits fluid to be discharged from the chamber 46 through the bore 48, opening 50, recess 49 and opening 39 into the outlet of the valve. The discharged fluid is replaced by fluid supplied from the inlet side of the valve. The flow of fluid through chamber 46 causes a conversion of potential energy into velocity energy, to the effect that the pressure in this chamber decreases as the valve is moved further away from its seat. The operation of the valve in this respect is the same as that of the valve in Fig. 1. The relative decrease of the biasing force depends upon the dimensions of the various openings, particularly the dimension of the openings 47, 50 and 39. The dimensions of these openings determine the resistance to the flow of fluid through the pressure chamber and accordingly the pressure within said chamber. According to the change of this resistance the valve has either zero regulation or a negative or a positive regulation.

In Fig. 7 I have shown an arrangement which permits adjustment of the regulation by changing the resistance to the flow of fluid through one of said channels. The arrangement comprises a movable valve member 51 corresponding to member 43 of Fig. 6, an annular member 52 defining a valve seat corresponding to the member 42 of Fig. 6 and a hollow valve stem 53 corresponding to the hollow stem 21 of Fig. 1. The movable member 51 is biased towards closing position by a spring 54. The movable valve member and the stem define a chamber 55 which communicates with the inlet side of the valve through an opening 56 in the valve disk. The valve stem 53 has an annular recess 57 corresponding to the recess 49 in Fig. 6 and an opening 58 corresponding to the opening 50 in Fig. 6 for permitting communication between the space defined by the recess and the pressure chamber 55. The movable valve member 51 has an opening 59 which gradually registers with the recess 57 in the stem as the movable valve member moves upward to permit flow of fluid from the pressure chamber into the outlet of the valve. In order to permit adjustment of the valve regulation I provide a pin 60 slidably arranged in the bore of the valve stem 53. The lower end of the pin has a cut-off portion 61 adjacent the opening 58. The upper end of the pin may be arranged similarly to the arrangement of the pin 36 in Fig. 1. The flow through the opening 58 is adjusted by turning the pin 60 whereby the cut-off portion 61 registers with a portion of the hole 58 and increases the resistance to the flow of fluid therethrough. In the position indicated in the drawing the resistance is a minimum and the flow of fluid through the pressure chamber accordingly a maximum. In this position we may assume that the valve has a negative regulation. If the opening 58 is partly shut by turning the pin 60, the flow decreases and in a certain position of the pin the valve has no regulation. If the pin is further turned, that is, the flow through the pressure chamber further decreased, the regulation of the valve becomes positive.

With my invention I have accomplished a simple and reliable construction for a relief valve in which the regulation of the valve may be adjusted. The arrangement is particularly important where the increase of the fluid pressure in a container beyond a definite value has to be prevented.

Another important feature of my invention is the elimination of vibrations of the movable valve member during fluctuations of the fluid pressure, particularly when the movable member is moved slightly away from its seat. The movable member with the pressure chamber behind it acts like a dashpot to take up or dampen the vibrations of the valve caused by sudden changes in fluid pressure. This eliminates undesirable noise during the relief valve operation.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States is:

1. In a relief valve structure, the combination of a casing defining an inlet, an outlet and a seat, a movable valve member, and fluid pressure actuated means for biasing the movable valve member towards the seat with a force decreasing in response to the opening travel of the movable member, said means comprising a chamber communicating with the inlet in closing position of the valve.

2. In a relief valve structure, the combination of a casing defining an inlet, an outlet and a seat, a stem fastened to the casing, a valve member slidably arranged on the stem and defining a chamber therewith communicating near the edges of the seat with the inlet of the valve, and a spring for biasing the valve member against the seat.

3. In a relief valve structure, the combination of a casing defining an inlet, an outlet and a seat, a stem fastened to the casing, a valve member slidably arranged on the stem and defining a chamber therewith, a spring for biasing the valve member towards the seat, the member having openings for permitting fluid under pressure being conducted to the chamber and for relieving the pressure within the chamber in response to opening travel of the movable member.

4. In a relief valve structure, the combination of a casing defining an inlet, an outlet and a seat, a stem fastened to the casing, a movable valve member having a cylindrical portion sliding on the stem and a disk united with the cylindrical portion defining a chamber, and means for biasing the disk towards the seat comprising a spring and fluid under pressure forced into the chamber with a pressure decreasing in response to the opening travel of the valve.

5. In a relief valve structure, the combination of a casing defining an inlet, an outlet and a seat, a stem fastened to the casing, a movable valve member slidably arranged on the stem and defining a chamber communicating through an opening in the wall of the member with the inlet side of the valve, a spring for biasing the movable member towards its seat, and a pin projecting through an axial bore in the stem for adjusting the maximum opening travel of the movable member.

6. In a relief valve structure, the combination of a casing defining an inlet, an outlet and a seat, a stem having an axial bore and a lateral opening fastened to the casing, a movable valve member slidably arranged on the stem and defining a chamber communicating through an opening in the movable member with the inlet of the casing, spring means for biasing the movable member towards its seat, a lateral opening in the movable member located below the lateral opening in the stem at closed position of the valve and permitting fluid to flow from the inlet through the chamber into the outlet as the valve is opened whereby the force biasing the valve towards its seat decreases, and means for controlling the flow through the chamber comprising a pin having a cut-off end portion inserted in the axial bore of the stem.

R. WAYNE McLAUGHLIN.